Aug. 8, 1939.  H. J. MURRAY  2,169,071
TELEVISION SYSTEM
Original Filed Aug. 7, 1930

Inventor;
Howard J. Murray.

Patented Aug. 8, 1939

2,169,071

UNITED STATES PATENT OFFICE 2,169,071

TELEVISION SYSTEM

Howard J. Murray, New York, N. Y.

Refiled for abandoned application Serial No. 473,525, August 7, 1930. This application October 16, 1936, Serial No. 105,939

25 Claims. (Cl. 178—6)

A general object of my invention is to provide a television transmitting and receiving system having no moving parts.

One of the objects of my invention is to provide a device which may be employed to transfer subject matter characteristics at a remote point in desired sequence and in proper spaced relation so that the said subject matter may appear in effect on a certain receiver in a useful manner.

Another object of my invention is to provide means whereby subject matter characteristics may be usefully transferred by a co-operative action of light flux and electric flux.

Still another object of my invention is to provide means whereby current varied in accordance with image characteristics and hereinafter referred to as subject matter characteristic affected current may be employed to create subject matter affected magnetic flux positioned so as to be co-operatively associated with polarized light flux to thereby affect the said light flux and thus in effect transfer the said subject matter in proper sequence and in useful spaced relation to a receiving station.

A further object of my invention is to provide means whereby subject matter records may be transferred in a useful manner with employment of elements having an intangible status.

An additional object of my invention is to provide means designed to permit the correction of certain transferred distorted subject matter records when same are usefully reproduced so that the said subject matter may be reproduced in secret.

A still additional object of my invention is to provide means permitting light plane polarization rotation, analyzation, reflection and variation in a certain useful synchronous manner.

The invention also contemplates the co-operative association of stationary means whereby light flux and electric flux are caused to affect each other so as to usefully transfer subject matter from one place to another place.

In the following description names will be given to parts for convenience of expression, but the names are intended to be as generic in their application to similar parts as the art will permit.

The magnetic rotation of the plane of polarization of light is an accepted fact. It is also an accepted fact that the phenomena may be observed by either the transmission method or the reflection method. With either method it is known that the degree of plane rotation varies in some relation to the intensity and relative direction of the magnetic lines of force. While I shall describe my invention as applied to the transmission method, it should be understood that it could have been applied to the reflection method, or a combination of both methods.

According to the present invention, I employ several steps of plane polarization rotation and analyzation of light flux by the transmission method as some of the steps in transferring certain subject matter from a stationary or a moving medium, to a stationary or a moving medium.

It is known that light may be polarized when passed through such a medium as Iceland spar, or a polarizing film such as "Polaroid". If this polarized light is properly associated with magnetic flux the plane of polarization of the said light will be rotated in some relation to the intensity of the said magnetic flux and the intensity of the said light. If the rotated polarized light is passed through a second medium constituting a light analyzer and properly positioned the said polarized light will be analyzed. The intensity of the said analyzed light will vary with a change in the relative angular positions of the said polarizer and the said analyzer. Normally there will be only one relative angular relation of the said polarizer and said analyzer that will cause a maximum intensity of the said analyzed light.

According to the present invention it is proposed to employ the transmission method in connection with stationary polarizers, flux producing elements, and analyzers. My invention includes the use of one or more universal analyzers equipped with developed ruled line reflecting surfaces.

In general the invention when described in connection with one embodiment includes means providing a light polarizer, four flux producing elements, and two or more associated analyzing elements.

The invention allows numerous physical embodiments and two different types are herein illustrated for the purpose of showing the wide application of the invention, but it is understood the showings in the diagrams are largely diagrammatic merely being sufficient in detail to show applications of the invention. For example, it is obvious that the invention could be described in connection with a combined transmission and reflection method. In addition the sequential order of plane polarization and analyzation may be changed without departing from the spirit of the invention.

Figure 1:
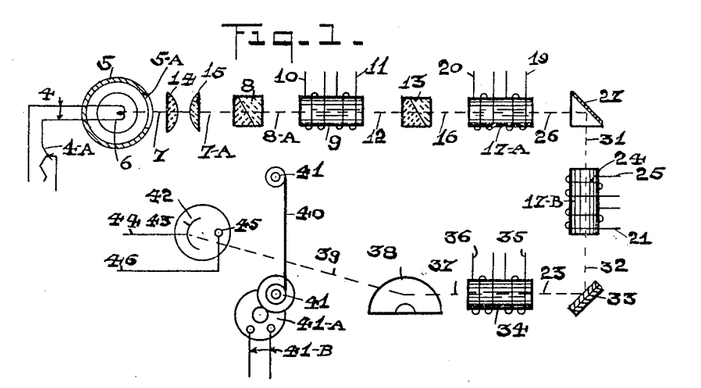
Figure 1 is a diagrammatic arrangement of the transmitting and receiving equipment.

Referring now to Figure 1 there is shown a pair of current supply leads such as 4 arranged to conduct current to the light producing element 6 suitably mounted in operating relation to a reflecting element 5 formed with an opening 5—A so as to permit a shaft of light such as 7 to be passed through suitable condensers such as the elements 14 and 15. The condensed light beam such as 7—A is passed through an element 8 constituting a light polarizing medium such as Iceland spar positioned so that the resultant polarized light 8—A may be transmitted through the plane rotating medium 9 around which is wrapped a constant flux producing winding 10 and a subject matter flux producing winding 11. The medium 9 may be formed of glass, or any of the known transparent substances conventionally used in the rotation of polarized light, or it may take the form of a thin glass tube filled with plane rotating liquid. The source of light such as 6 may be varied in intensity by any known current affecting means such as the rheostat 4—A, or by varying the voltage of the current supplying the leads such as 4.

The light beam 8—A when polarized is transmitted through the rotating medium 9 and the plane of polarization of the said light is rotated due to the action of the flux created by the combined efforts of the current flowing in the winding 10 and the subject matter current flowing in the winding 11. An analyzer 13 of a more or less conventional type is positioned in the path of the plane rotated beam of light 12 so that the analyzed light as 16 will lie approximately in the normal plane polarization of the light such as 12.

When the plane polarization of the light 12 is rotated due to the change in density of the magnetic flux of element 9, then the analyzed ray such as 16 will not be passed or will be decreased in intensity. All of the foregoing is known and accepted in the art as may be seen by reference to my Patent #1,629,727 issued May 24, 1927.

In this event the intensity of the light beam such as 16 will vary in accordance with the variation of the subject matter characteristic current flowing in the winding 11. If this current is obtained from a space current receiver, it may be considered as a subject matter current resolved out of a composite space broadcast current and supplied to the winding 11.

In addition the variations of the current flowing in the winding 11 may be considered in effect as current embodiments of certain image subject matter impressed on a certain scanner at a remotely positioned station. Hence the intensity of the light variations of the beam 16 may be identical to and in synchronism with the reception of the said subject matter records by the said scanner.

Now the varying beam 16 is transmitted through a second plane rotating magnetic flux created by direct current flowing in the winding 20 and a so-called oscillating current flowing in the winding 19. These windings are wrapped about the element 17—A which may be similar in form to the element 9. The plane polarization of the beam 16 is rotated by this varying flux and if the said flux variation is in synchronism with the said oscillating current, then the plane polarization of the light such as 26 will be rotated in synchronism with such oscillating current variations. Now the rotated and oscillated polarized light beam 26 will also vary in intensity according to the characteristics of the said subject matter current as hereinbefore described. Consequently the light beam 26 will vary in intensity as its plane of polarization is rotated in accordance with the variations of the said oscillating current.

Let it be assumed that the said oscillating current has been resolved from the same composite broadcast current from which the said subject matter current was resolved. A method of resolving a plurality of currents from a composite current may be employed. If the said currents are combined in some desired relation at the transmission end, it is obvious that the said currents will bear the same relation when they are separately resolved and passing in the windings 11 and 19. Let it be assumed for the sake of this description that the said currents are sine waves in form and that the frequency of the record current is 300 times that of the oscillating current. In this event the plane polarization will be rotated between limits during the time the beam is varied in intensity (that is, may be varied) 300 times.

A universal analyzer, such as the element 27 is positioned in the path of the rotated and varied beam 26. This analyzer is designed as a "universal analyzer" because its analyzing surface is so formed as to analyze the beam 26 continuously during the existence of the said beam over its entire range of plane rotation. That is some light will be reflected as beam 31 for every position of the plane polarization of beam 26. In order for such analyzing action to occur it is obvious that the reflecting surface of the analyzer must be universal. For the purpose of this description let it be assumed that this surface is a developed ruled line surface constituting a portion of a cone surface. Now the normal plane of polarization is assumed to lie in the plane of the paper upon which Figure 1 is drawn. It is assumed also that the axis of the cone of which the reflecting surface is a portion (surface portion) also lies in this said normal plane. As long as the plane polarization of the beam is normal, it is obvious that polarized light, such as beam 31, will be reflected. As the said plane of polarization of the beam 26 is rotated out of the said normal plane due to the action of the flux created by current flowing in the winding 19 then the surface must be found in the surface of the analyzer 27 that will lie in the new plane of rotation. As the plane polarization is rotated, a surface must be found for each possible plane position. If the rotation of the plane of polarization is continuous and in accordance with the current variation of the said oscillating current, it is obvious that a continuous succession of ruled line surfaces must be available so as to analyze the said light at the said plane polarization positions.

Investigation will show that a developed ruled line conical surface is one of the surfaces that will continuously provide ruled surfaces that will lie in any given plane of rotation over a given range of oscillation.

Let it be assumed for the sake of this description that the said oscillating current flowing in the windings 19, 25 and 24 has a frequency of 2700 cycles per second. As each cycle is composed of two alternations then the beam of light 26 will be affected as hereinbefore described to have its plane of polarization rotated 5400 times per second, and the intensity of the beam 26 may vary 300 times during each rotation. The variations are assumed to be regular only for the sake of the description. In any event there is a time space during each rotation for 300 light variations. It will be easier to conceive the action of the system if this time space is taken for granted. In actual operation the variations may be grouped, and there may be (say) 20 time spaces during which the light does not vary.

Now the ruled line surfaces of the universal analyer such as 27 reflect such portions of the beam 26 whose plane polarization lies in the same plane as the ruled surface. Under certain conditions their portions will be approximately equal and a steady projection of portions of light will be transmitted to be co-operatively associated with a third magnetic flux existing in the element 17—B. The reflection of these equal portions will be more or less uniform depending on the form of the alternations of the said oscillating current and the accuracy of the reflecting surface of the analyzer.

Figure 3:
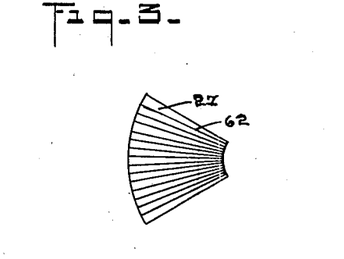
Figure 3 is an enlarged plan of the developed ruled line surface of one of the continuous analyzers.

Visibly these reflected light portions will appear as a beam of light, but actually succeeding projections appear in proper sequence to cause a beam of oscillating light having an oscillating frequency of 5400 times per second. Each oscillation in effect may have superimposed upon it 300 light records. One embodiment of the reflecting surface of the analyzer 27 is shown in Figure 3. The lines are assumed to represent the ruled line surfaces presented in succession to the moving plane of polarized light during a given range of rotation. As the lines of Figure 3 appear to converge so will the reflected portions of light such as 31 converge on the reflecting surface of the element 33 hereinafter described.

The winding 20 of element 17—A is in series with the winding 21 of the element 17—B. Also the winding 19 is in series with the winding 24. Windings 20 and 21 and 19 and 24 are assumed to be similar in all respects, as are elements 17—A and 17—B. Consequently the magnetic flux of 17—A and 17—B are similar at all times. The element 17—A may be designated as a North element, and the element 17—B as a South element. Consequently the direction of rotation of plane polarization by the flux of 17—B will be equal to the plane rotation by the element 17—A and relatively in the opposite direction. Hence, it follows that if a polarized beam is first rotated by the flux of the windings 19 and 20 in one direction and then rotated by the flux of the windings 21 and 24 to the same extent in the opposite direction the said plane of polarization of beam 32 will lie in the same plane as of the beam 16. Now the surface of a reflector such as the element 33 may be so shaped that it will tend to spread out the individual sheets of varying light together constituting the oscillating beams 31 and that although the plane of polarization will not be actually parallel in all these sheets constituting the beam 32, the pane of polarization of all the sheets when reflected from the element 33 as beam 23 will be parallel.

It is evident that an extra reflecting surface may be positioned in the path of the beam 23 after the same has been reflected from the element such as 33. The surface of this reflector could be perfectly flat and thus act as a filter to eliminate any stray light of the polarized sheets of light constituting the beam 23, or any portions of polarized light whose plane of polarization is not parallel to the parallel sheets. It is obvious that the universal analyer 27 may be set so as to be in the center of the 300 light variations, and in this event the plane of polarization of the 150 light variations on either side would progressively increase. If the summation of the individual rotations on either side equal each other then the analyzer such as 27 is correctly positioned.

In accordance with this action then the beam 23 will consist sequently of (say) 300 sheets of light, these sheets will each progressively appear 5400 times per second. Each of these sheets will vary in intensity in synchronism with certain subject matter records superimposed in effect on the subject matter current flowing in the winding 11 of the element 9. Hence, 5400 times 300 or 1,620,000 flashes of polarized light will be directed to traverse a fourth magnetic flux created by the direct current winding 35 and the so-called "vertical" current winding 36 of the element 34.

As hereinbefore explained the plane of polarization of the 300 sheets (say sheets for the purpose of description) will be approximately parallel, and the plane of polarization of the beam 12 will be relatively parallel to these planes, and the sheets will have an appreciable width and no appreciable thickness.

The so-called "vertical" current is so designated because it is employed to cause the said oscillations of the beam 23 to move in effect in a progressive manner (say) up and down the surface of a receiver or subject in a vertical manner. The frequency of the change of "vertical" current may be assumed as 18 per second. This is considered as the smallest frequency or occurrence necessary to properly maintain a moving picture and hence the same frequency may be used in the reproduction of pictures by television. This so-called "vertical" current may be resolved from a so-called broadcast composite in the same manner that the subject matter and oscillating currents are resolved. This vertical current may be obtained in any other known manner. The only requirement is that it must have a certain relation to the said subject matter and oscillating currents.

As the said recurring 300 sheets of polarized light constituting the beam 23 traverse the flux created by the current in the windings 35 and 36 in a parallel relation it is obvious that they would normally emerge as the beam 37 in the same parallel relation. But the flux created by the "vertical" current flowing in the winding 36 will vary the total flux of the element 34 and the plane polarization of the sheets will thereby be rotated to the same extent as they appear.

The total flux of the element 34 will be varied (say) 18 times per second, and there will be 5400, divided by 18 or 300 sets of sheets of polarized light affected by each flux variation. In each set of sheets there will exist in effect 300 light records. It follows then that 300 times 300 light records will be in effect transmitted through the flux of the element 34 for each alternation of the current flowing in the winding 36, or in other words 90,000 subject matter records will be transmitted for each cycle of the vertical scanning current flowing in the winding 36.

Now if these 90,000 light records are equally and progressively sprayed in effect over a three-inch square receiving surface at a rate of 18 times per second a moving picture may be visibly maintained. If the records are sprayed 100 fine (100 to the inch) it is evident that it will take 300 such records to cover a line 3 inches long. It will also take 300 sets of 300 subject matter records to cover the area when it is 3 inches square. This, of course, corresponds to the 90,000 records impinged on the said reflecting surface 33 as hereinbefore described.

As each of the sheets together constituting the beam 37 occurs 5400 times each second, it is obvious that 5400 subject matter records have been separately superimposed on the said sheet in that time, but for each cycle of the current flowing through the winding 36 only 300 records have been consecutively superimposed on the said sheet.

If we assume the three-inch square subject matter receiving medium to be divided into 300 horizontal portions, and these horizontal portions again divided into 300 equal parts we will obtain 90,000 pieces. Each piece will represent the area to be covered by one of the subject matter records falling on the reflector 33. It is evident that the sheets constituting the beam 37 in effect may be cut into 300 equal pieces. We would then have 300 rows of characteristic records, and each row would have 300 records, or 90,000 in all. This would be the same arrangement as just described for the said receiving surface.

The 90,000 distinct subject matter records are all reflected from a third analyzing surface such as 38 at the rate of 18 times per second. It is the reflecting or analyzing action of this surface which direct these 90,000 subject matter records in the form of light to the proper one of the 90,000 elementary portions of the record receiving surface 40. This receiver 40 may be of any conventional form, or it may be in the form of a movable film such as is used in moving picture cameras in which the area submitted to the light beams 39 is changed 18 times per second.

Now in actual operation these 90,000 subject matter records are arriving on the surface of the receiver such as 40 in a regular and uniform manner. The plane of polarization of all the 90,000 records are rotated by the action of the flux of the current flowing in the winding 36 to a different degree, and because of this action the 90,000 light records are in effect reflected to the 90,000 elementary areas of the receiver. All the 90,000 bear a certain phase relation to the said "vertical current" because the said 90,000 records were transmitted from the said remote station in the same phase relation. However, it is difficult for the mind to conceive of these 90,000 records relative to a cycle of the said "vertical current" and I have therefore assumed that it would make the description clearer if the said "vertical current" be assumed to increase and decrease in 300 distinct steps. It must be understood that I am aware that the rotation of plane polarization of the 90,000 sheets is progressive during a given current change in the winding 36, and that the angular difference between any two of the 90,000 sheets occurring during a current change may be the same. However, for the purpose of this description it will be assumed that the increase or decrease of flux created by winding 36 is divided into 300 distinct steps. It follows then that there will be 300 distinct degrees of plane polarization of the sheets of light constituting the beam of light such as 37.

It must be noted, however, that only one of these sheets exists at a time so the said distinct steps of flux change must last long enough to cover 300 sheet intervals whether the sheets appear or not. But all of the sheets appearing during this interval of the said flux step will be composed of polarized light with plane rotation to the same degree. All of the sheets appearing during the next flux step will be composed of polarized light with plane polarization to another degree. Now let it be assumed that each successive set of 300 sheets is associated with one of the 300 steps of flux change. In this event there will be provided 300 sets of sheets of 300 sheets each, and each set of 300 sheets will consist of polarized light with the same degree of plane polarization.

The degree of plane rotation from one set of sheets to the next set may be progressive. That is the increase in the degree of plane rotation from the first set of 300 sheets to the last 300 sheets may increase in the same relation as the increase of the said "vertical" current flowing in the winding 36. This increase may follow the sine law (or it may not).

According to this description then, it is obvious that the analyzing action of the reflector 38 reflects 300 sets of 300 sheets to the receiver 40. Each set of sheets progressively arriving with the same degree of plane rotation, and the individual sheets (or portions of same) progressively reflected to its proper section or elemental area on the receiver 40. It may be said that the original subject matter broadcast from the said remotely positioned station is usefully reassembled on the surface of the receiver such as 40 by the magnetic analyzation of a beam of light, such as 8—A.

It will be recalled that I provide a ruled line surface to lie in the plane of every degree of plane rotation of the light comprising the beam 26. So in the case of the reflector 38, I provide surfaces that will be perpendicular to the plane polarization of all the 300 sets of 300 sheets. Hence these surfaces lie in these various planes. These surfaces for any given part of 300 sheets will constitute a line, and in the case of a distinct step of 300 sheets a ruled line.

There are many possible surfaces that may be given to the reflector such as 38. The actual form will depend on many conditions such as the manner in which it is desired to reflect the resultant subject matter beams indicated on Figure 1 as 39. The form will also depend on the relative position of the said sheets of 37 as they impinge on the surface of the reflector 38. The form will also be governed by the form of the receiver 40. In addition the form may also be affected by the combined action of the surfaces of the elements 27, 33, 39 and 40, and the relative position of the said elements.

In any event it may be assumed that the reflecting surface of the element 38 may consist of (say) 90,000 infinitesimal reflecting portions, each portion represented by an elemental section forming a portion of the receiver 40. In other words, according to my invention I provide 90,000 polarized light analyzers to reflect 90,000 beams of light to 90,000 surfaces.

Each one of these surfaces will analyze light representing one of the said image subject matter records impressed on the subject matter current flowing in the subject matter winding 11 of the element 9. Now while it is necessary to consider the subject matter records as divided into 300 sets of 300 each for the purpose of this description, it is obvious that the analyzation is continuous and the subject matter records may occur at the rate of 300 times 300 times 18 or 1,620,000 per second. There must be a place for 1,620,000 light variations, but the variation may not occur due to the status of the subject matter scanned. Consequently, these subject matter records will be reflected to the receiver 40 so as to cover the area in proper sequence and in proper spaced relation 18 times per second.

The 300 sets of 300 each of subject matter records together constitute a complete image, and 18 images in effect will visibly (or otherwise) appear on the surface of the receiver 40.

The invention so far has been described in connection with a television receiving system. I shall now describe how practically the same apparatus may be employed to transmit image subject matter records constituting the images superimposed on the light reflected to the receiver 40 when used as a receiving system, or an element of a receiving system.

If the subject matter record current flowing in the winding 11 of the element 9 be cut off and a so-called subject scanning current permitted to flow in the said winding, it is obvious that a regular variation of the flux produced by the said winding will occur (say) at the rate of 1,620,000 per second. The analyzer 13 will pass 1,620,000 flashes of light all of the same intensity. By following through the various actions previously described, it will be seen that the receiver 40 will be completely and uniformly sprayed on each of its 90,000 elementary areas at the rate of 18 times per second. If the element such as 40 includes a developed subject matter surface such as a previously developed film, then these 1,620,000 flashes of light will variously penetrate the film according to the density of a particular portion or elementary area located in the path of a particular flash of light.

Only one flash of light will exist for any given instant, and the light sensitive element such as 42 including terminal portions 43 and 45 connected to leads 44 and 46 will be affected in proportion to the intensity of the said particular flash as it emerges from the element. As these flashes of light completely cover the subject area of the element 40, 18 times per second, it follows that the image upon 40 may be completely changed 18 times per second.

It is understood that while a developed image film is shown in the drawing that other images may be provided without departing from the spirit of the invention, and that any known scanning means may be employed.

The light variations representing the subject matter may be transferred to current variations in the circuit of which the light sensitive element 42 and the leads 44 and 46 are a portion, and this complete transfer will take place in proper sequence and spaced relation during the time interval of a (say) second. It is understood that all the means shown in Figure 1 are parts of a broadcasting station and that the subject matter scanning current, the oscillating current flowing in the windings 19 and 24, and the vertical current flowing in the winding 36 are all supplied in certain phase relation. For example 300 cycles of the scanning current during one cycle of the oscillating current, and 300 cycles of the oscillating current during one alternation of the vertical current.

It is assumed that the leads 44 and 46 are connected to suitable modulating means. Any desired type of known transmitting station may be used as hereinbefore stated. I have omitted the showings of any station in order to simplify the drawing and the description, as I do not consider that it would involve invention to connect the leads to any of the many known transmitting systems.

According to the present invention the means shown in Figure 1 may be used as a transmitting or a receiving station by the simple act of substituting a subject matter scanning current for a subject matter affected current in the winding 11, and the additional step of replacing the developed surface of the receiver 40 with an undeveloped surface. I have not shown the means for combining the scanning, oscillating and vertical currents into a composite current at the transmitting station, nor any means of broadcasting the same. Neither have I shown means for receiving the said broadcast composite current at a receiving station, and for resolving the said received composite current into separate scanning, oscillating and vertical currents. Incidentally, the motor 41—A moving the film 40 would have a speed related to the frequency of the vertical current. In the event of ordinary visible reception of course the receiving surface of 40 would not be moved, nor would the image at the transmitting end be replenished 18 times per second.

I have left out the current producing and resolving means because I assume that the system disclosed in my above noted application or any other known method could be employed by those skilled in the art without involving invention. In the event that any of the above noted systems are used it is obvious that the subject matter records will be received in the same 300 sets of 300 records as hereinbefore described. This will occur because the reproduction will occur in the same manner as the scanning.

*Note.*—It must be remembered that actually the 300 sets of 300 subject matter records exist only for the purpose of this description, and are so designated only for the purpose of describing the invention.

Figure 2:
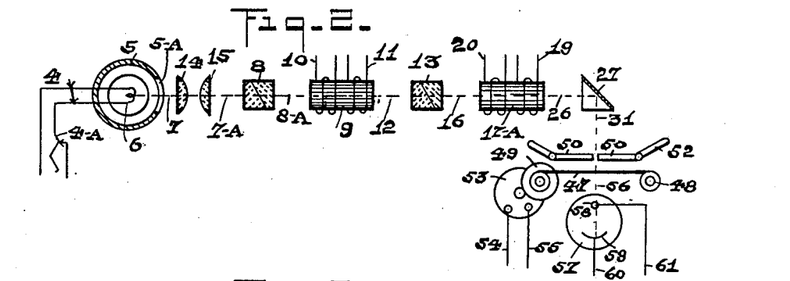
Figure 2 is a schematic arrangement of a modification of the means shown in Figure 1.

In Figure 2 there is shown a modification of the means shown in Figure 1 in which a moving part 40 is included to provide in effect a second dimension to the operation of recording on a moving receiver the received subject matter records. This moving part is the film 47 supported and stored on the rollers 48 and 49 rotated by the motor 53 actuated by current supplied by the leads 54 and 55. As the movement of the film 47 provides for vertical movement all of the apparatus of Figure 1 beyond the beam 31 is not required, except the light sensitive element 42 as hereinafter described. The variable apertures 50 and the film 47 and associated parts are substituted for the removed parts of Figure 1.

By varying the opening formed by the variable aperture 50, it is evident that the width of the beam 31 may be varied. As hereinbefore explained the beam such as 31 is composed of (say) 300 sheets of polarized light, and each sheet either by its presence (or absence) represents a subject matter record. As the beam in effect oscillates due to the successive appearance of the said 300 sheets, the moving film 47 will be affected accordingly. If the rate of movement of the film and the rate of light oscillations are properly synchronized, it is obvious that the said light records will be recorded on the moving film 47 in proper sequence and in proper spaced relation.

It should be noted that the sequence of co-operation of the light flux and the magnetic flux may be varied. For instance, the beam seven (7) may first be associated with the magnetic flux produced by the windings 19 and 20, instead of with the magnetic flux produced by the windings, such as 10 and 11. In other words, the light may in effect be oscillated first and then varied.

There are many ways of positioning the normal plane of polarization. I mean by the term "normal" the position the plane of polarization would assume when unaffected by varying magnetic flux. In one embodiment of the invention, I adjust the parts so that the plane of polarization took the position shown in the drawing, or the plane of the paper upon which Figure 1 is placed. In another embodiment, the position shown in the drawing was assumed when the combined flux due to the windings 10 and 11 was at a maximum. It is evident that the plane of polarization is held in this position due to the combined efforts of the flux from the current flowing in windings 10 and 11, and any decrease in this flux strength will cause the plane of polarization to move out of the plane of the paper and the polarizing plane of the analyzer 13, and this action will cause the polarized light indicated by beam 16 to disappear. It should be noted that the extent of the decrease of the combined flux strength is not important so long as the said decrease is enough to make the beam of light such as 12 disappear. Such an action provides a definite variation of the beam of light such as 12 from a maximum to a minimum at the same rate of the subject matter current without a definite relation to the variations in strength of the said subject matter current. This, of course, is only one of the many possible variations in the embodiment of my invention. There are, of course, many possible ways of arranging the windings, such as 10, 11, 19, 20, 21, 24, 35 and 36, and of associating the flux produced by same. There are embodiments possible in which the flux is decreased in cross section, and in which the flux created by the said windings traverse only a portion of the elements, such as 9, 17A, 17B and 34.

One form of magnetic structure tried out as an embodiment of the element 9, 17A and 17B included a plurality of tubes sealed at both ends when placed in a horizontal position, and one end when in a vertical position and filled with various liquids.

It should be understood that I am fairly well informed in the physics of light, and that I am fully aware that many light affecting elements could be added to the means shown in Figure 1 of the drawing. For example, I could have shown additional lenses between the source of light 6 and the condenser 14. There are many other places that additional analyzers, reflectors and perhaps various forms of lenses could be added in order to make the action of the light more nearly perfect and to keep same more nearly to a desired path, and in more compact form. As long as I could add one known element as easily as any other, I eliminate all of them so as to keep the drawing as simple as possible. I feel that anyone skilled in the art could produce an embodiment of the present invention either by the use of the means shown, or by the addition of other known means. For the same reason, I have eliminated many known current affecting elements, such as rheostat, switches, condensers and fuses.

Therefore, while I have shown and described and have pointed out in the annexed claims, certain novel features of my invention, it will be understood that various omissions, substitutions and changes in the form and details of the devices illustrated or in its operation may be made by those skilled in the art within the scope of the claims without departing from the spirit of the invention.

While I have described my invention in connection with the transmission method, and more specifically to a television system, it should be understood that the invention is not so limited, and that it may be used in any condition wherein the continuous analyzation of polarized light may be employed.

When modified to a transmission system wherein an analyzer is provided with a plurality of crystals with the plane arrangement radiating from a given center, it is evident that indications of the change of status of liquids and gases may be obtained. It is also obvious that this indication may be continuous as the plane polarization is rotated due to change in the said status, and this change of plane polarization is indicated by the said universal analyzer.

Current changes may be rendered visible by such a device, and the analyzed light may be employed to affect current devices proportional to the changes in solids, liquids, and gases. Because of this, my invention may be incorporated in control devices.

In fact, the invention may be applied to any condition wherein the rotation of the plane of polarization may be universally analyzed.

Having thus described my invention, I claim:

1. A picture reception apparatus comprising a source of light, means for reflecting the said light, optical means for desirably directing the said light, stationary means for polarizing the said directed light, a plurality of stationary means for creating a resultant magnetic field of flux designed to rotate the plane polarization of the said directed polarized light, stationary means for analyzing the said light as its plane polarization is rotated through a given analyzing plane by the action of the said resultant magnetic field of flux, a second magnetic means arranged for magnetically rotating the plane polarization of the said analyzed light due to the action of its magnetic flux, means constituting a stationary universal polarized light analyzer formed to include a plurality of ruled line reflecting surfaces, means for creating a third named magnetic field producing means designed similar to the second named magnetic flux creating means so as to produce a flux in phase opposition to the flux produced by the said second named magnetic means thereby to rotate the said sequentially analyzed light to its relatively original plane polarization, a third stationary analyzer designed to analyze the said light while being rotated by the third named magnetic field as it passes through the said original plane polarization, a fourth named means for creating a magnetic field of flux designed to rotate the plane polarization of the portions of polarized light as analyzed by the said second named stationary analyzer, a fourth named universal analyzer designed to synchronously reflect the elementary portions of the said light as they are plane rotated by the magnetic flux created by the said fourth named magnetic means according to the characteristics of the said flux and thus direct the same in a sequential manner to a light sensitive element positioned in the path of the said reflected light, means constituting the said light sensitive element, and means for including the said light sensitive element as a portion of a circuit organization.

2. A picture reception apparatus for continuously analyzing polarized light magnetically rotated by certain sequential transmission through a plurality of magnetic fields and stationary light analyzers, means for creating the said light, means for reflecting the said light, optical means for desirably concentrating the said light, stationary means for polarizing the said light, a plurality of separate means for creating the said magnetic fields oscillating in definite relation to each other, a plurality of stationary universal light analyzers positioned between the said magnetic fields and in the path of the said light, means constituting a picture receiving medium including a light sensitive element designed to receive elementary portions of the said light in a progressive manner whereby the said elementary portions will collectively record a certain picture.

3. A picture reception apparatus including means for sequentially analyzing elementary portions of a beam of polarized light during the rotation of their planes of polarization as a result of the sequential transmission of the said elementary light portions through a plurality of separate oscillating magnetic fields, certain of said analyzing means designed for universal reflection, and certain other of said light analyzing means designed for single plane reflection, means for causing the said light, means for polarizing light, means for separately creating the said magnetic fields in certain phase relation, means for providing a plurality of separate universal stationary light analyzers, means for creating a single plane light analyzer, and means for providing a picture receiving medium positioned in the path of the elementary portions of light as they are sequentially analyzed.

4. In a system designed for the useful reception of images, means for producing a beam of light, means for polarizing the said light, means for creating a first named alternating magnetic field, optical means including a mirror for transmitting the said light along a desired path, said first named magnetic means arranged for magnetically rotating the plane polarization of the said polarized light beam in synchronism with the said magnetic field alternations, stationary means for analyzing the said magnetically rotated light, means for supplying a current for creating a second named magnetic field so as to cause same to oscillate in definite relation to the first named magnetic field alternations, means for providing a flux path for the said second named magnetic flux, said second named field flux positioned in the path of the said analyzed light thereby to rotate said light in synchronism with the said second named field flux oscillations, means constituting a stationary universal light analyzer including a plurality of ruled line reflecting surfaces, a third named magnetic field producing means for creating an oscillating field in relative phase opposition to the second named field alternations for rotating the plane polarization of the light analyzed by the said universal analyzer to its original plane polarization, stationary means for reflecting the light rotated by the third named magnetic field and designed to direct the said light through a fourth named magnetic means, means for creating a magnetic flux in the fourth named magnetic means and positioning same in the path of the said rotated and analyzed light thereby to again rotate the plane polarization in synchronism with the characteristics of the said fourth named magnetic means, a fourth named stationary analyzing means positioned in the path of the said light rotated by the fourth named magnetic field and designed to universally reflect the multi-rotated and multi-analyzed light to a picture receiving medium whereby the said reflected light will be progressively intercepted as elementary portions of the said beam so as to collectively reproduce the said images in a visible manner, and means constituting the said picture receiving medium.

5. In a system designed for the useful reception of images, optical elements at a transmission station for producing a beam of light, said means including a reflector for desirably transmitting the said beam through a plurality of elements including a light polarizer and a first named magnetic field of flux, means for producing the said magnetic flux so that the plane of polarization of the said beam will be rotated in a certain synchronism with certain image subject matter current variations received from the said transmission station, a first named stationary means constituting a Nicol prism for analyzing the said subject matter affected polarized light thereby to vary the intensity of the said light in synchronism with the said subject matter current variations employed to create the first named magnetic field of flux, means for producing a second named magnetic flux so that the same will vary in strength in a definite relation to the first named magnetic flux whereby the plane polarization of elementary portions of the said varied light will be rotated in synchronism with the variations in density of the said second named magnetic flux as it varies in a certain frequency relation to the subject matter current employed to produce the first named magnetic flux, a second named stationary means for universally analyzing the said double rotating varied light from a plurality of ruled line surfaces and thereby reflect same from certain of the said ruled line surfaces in synchronism with the variations of the said second named magnetic flux, means positioned in the path of the reflected universally analyzed light and designed for producing a third named magnetic flux so that the same will synchronously vary in opposite phase relation and instantaneously exist similar in all respects to the said second named magnetic flux whereby the said universally analyzed and reflected light will be plane rotated to its relatively original plane of polarization, means constituting a third named stationary analyzer fixed in the path of the said plane neutralized light portions and designed to filter out the polarized light not rotated to the said original plane of polarization by the third said magnetic flux and for reflecting same through a fourth magnetic field of flux, means for producing the said fourth named magnetic field of flux positioned in the path of the said reflected unfiltered light and designed to rotate the plane of polarization for the fourth time in a definite time relation to the oscillations of the said second and third named magnetic field of flux, means constituting a fourth named stationary universal analyzing element including a plurality of ruled line reflecting surfaces designed to reflect the fourth named flux affected light to a picture receiving medium according to the combined characteristics of the said subject matter affected flux, the second named flux and the fourth named magnetic flux, and means constituting the said picture receiving medium including means for supporting same in the path of the said reflected light.

6. In a system for the reception of pictures, means for producing a beam of light, means for polarizing the said light, means for transmitting the said polarized light through an oscillating magnetic flux arranged to rotate the plane polarization of the said polarized light in synchronism with the variations of certain subject matter current, means for employing the said current to create the said flux, stationary prismatic means for analyzing the said magnetically affected light thereby to vary the intensity of the said polarized light in synchronism with the variations of the said subject matter current, means for producing a second magnetic flux in certain relation to the said subject matter current flux variations of the first named flux, means for transmitting the said analyzed light through the second named flux whereby the plane polarization of the said analyzed light will be rotated in synchronism with the variations of the second named flux, stationary means for universally analyzing the said double rotated light, said universal analyzing means including a plurality of symmetrically positioned reflecting means providing ruled line surfaces radiating out from a given point, means constituting a variable aperture element movable about a given axis so as to adjustably cause to be adjusted to permit a portion of the said universally analyzed light to progressively impinge on a movable subject matter receiver, means constituting the said movable receiver including a light sensitive element constituting an undeveloped film, means for supporting the said film and moving same in a synchronous relation to the variations of the current employed to produce the second named flux, and means for releasing the said film as it is moved into the path of the said reflected light portions, and means for storing the said film.

7. In a system for the reception of pictures, means for producing a beam of light, means for polarizing the said light, optical means for transmitting the said beam through an oscillating magnetic field thereby to rotate the plane of polarization of elementary portions of the said beam in synchronism with the characteristics of certain subject matter current, stationary means for employing the said current to produce the said field, stationary means for analyzing the said magnetically affected light thereby to vary the intensity of same in synchronism with the said subject matter current variations, means for producing a second named magnetic field positioned to be traversed by the said analyzed polarized light thereby to employ the said second named magnetic field to rotate the plane of polarization of the said light in accordance with the characteristics of a train of oscillating currents producing the said second named magnetic field and having an oscillating relation to the current producing the first named magnetic field, means constituting a stationary universal analyzer positioned in the path of the said doubly rotated light so as to universally analyze the same as the plane of polarization is rotated by the second named magnetic field, said universal analyzer formed to provide a plurality of ruled line reflecting surfaces, means for creating a third magnetic field of flux in opposite phase relation to the second named flux whereby the plane polarization rotation of element portions of light by the second named flux will be neutralized by the third named magnetic field of flux, means constituting a third stationary single plane analyzing member positioned in the path of the said beam of light to reflect the light plane rotated by the third named magnetic field, means for producing a fourth named magnetic field positioned in the path of the said light reflected from the said single plane reflector analyzer, circuit means for associating the said first named field producing means, said second and third named field producing means and said fourth magnetic field producing means whereby the variations of the magnetic flux produced to constitute the said fourth magnetic field will vary in density in a definite relation to the said first named magnetic field variation and the said second and third named magnetic fields, a fourth named stationary analyzer positioned in the path of the elementary portions of light rotated by the said fourth named magnetic field and provided with a plurality of ruled line surfaces symmetrically positioned about a common axis thereby to sequentially reflect the said portions in a sequential manner to a picture receiving medium, means for replacing the said picture receiving medium with an image whereby the said reflected elementary portions may be varied in density as they are passed through elementary portions of the said image, and a circuit organization including a light sensitive element responsive to the variations in density of the said image affected elementary portions of light.

8. The combination of a television system including a combined sending and receiving station, said system including means for alternately transmitting polarized light through a plurality of flux fields and single plane and universal light analyzing elements, said fields and said analyzers positioned in co-operative relation so as to be responsive to the combined characteristics of the energy received by the said fields for forming in effect a succession of images upon a light sensitive element, certain of said analyzers provided with a plurality of ruled line reflecting surfaces so as to universally reflect and analyze polarized light with many degrees of plane polarization, certain other of the said analyzers arranged for analyzing only polarized light with a given plane polarization, and means constituting a light sensitive element positioned to intercept the said light when effected by the combined said characteristics.

9. In a system for the transfer of pictures by electricity, means designed to produce a beam of light, means for polarizing the said light, a plurality of plane rotating means for separately rotating the plane polarization of elementary portions of the said light a plurality of times in desired sequence due to the separate transmission of the said light portion through the said rotating means in the same sequence, a plurality of separate stationary light analyzing means for analyzing the said polarized light, said analyzing means positioned to analyze the polarized light between the said rotations as the plane polarization is rotated by the said rotating means, certain of the said analyzers formed with a plurality of ruled line reflecting surfaces so as to universally analyze and reflect the said light as the plane polarization of elementary portions are collectively rotated, and certain other of the said analyzers arranged for single-plane analyzation as the plane polarization is rotated through a given plane by certain of the said rotating means, means for positioning the above named means thereby to project the said analyzed elementary portions of the said beam alternately upon an image and a light sensitive element constituting a screen, and means associated with the said image for transferring the characteristics of the said image into corresponding current variations.

10. In a system for the transmission of images, optical means for transmitting a beam of light through a plurality of separate flux fields in a certain sequence, stationary means for polarizing the said light before the said transmission, separate stationary means positioned in the path of the said transmitted light for analyzing the said light after sequentially passing through each of the said flux fields whereby groups of certain elementary portions of the said light will be analyzed in a certain sequence by certain of the said analyzers and thence groups of elementary portions by other of the said analyzers, certain of the said analyzers formed with a plurality of ruled line reflecting surfaces so as to universally reflect the said elementary portions in a sequential manner, adjustable means for obstructing a portion of the said analyzed light and to permit the remainder to impinge on a certain image in the same sequential manner, and a light sensitive element designed to be affected in the same sequence by the said image affected light.

11. In a system for television, a beam of light and means for producing same, a light polarizing means, a plurality of oscillating fields created in definite relation to each other, means for creating the said field, a plurality of stationary analyzers certain of which are formed for universal reflection and others of which are formed for single plane analyzation, optical means for transmitting the said light through the said polarizer, said fields and said analyzers, said transmission being in desired sequence so as to collectively modulate certain elementary portions of the said beam with certain characteristics of each of the said fields, and a movable light sensitive element constituting a receiving screen designed to be moved according to the oscillations of certain of the said fields thereby to cause the said modulated elementary light portions to be collectively recorded in a fixed manner.

12. In a system of television, an object screen, means for progressively and sequentially transmitting elementary portions of magnetically analyzed light through a plurality of portions of the said object screen in desired sequence so as to collectively modulate certain elementary portions of the said beam with the characteristics of the image on the said screen, same means including a light producing element constituting the source of the said light, means for polarizing said light, magnetic means for creating magnetic flux for rotating the plane polarization of the said elementary portions of the polarized light, a stationary light analyzing means, a second magnetic flux producing means, a second stationary universal light analyzing means including a plurality of ruled line reflecting surfaces symmetrically positioned about a common axis and radiating from a common point, a third magnetic flux producing means in synchronous relation with the second named flux producing means, a third stationary single-plane analyzing element, a fourth magnetic flux producing means, a fourth stationary analyzer including a plurality of ruled line reflecting surfaces, and a light sensitive element forming a portion of a circuit organization designed to transmit the light modulations received from the characteristics of the said image into corresponding current variations in the said circuit organization.

13. A picture reproducing organization including a source of polarized light, a subject matter field producing means, a first named oscillating field producing means, a second named oscillating field producing means, a plurality of stationary light analyzing means, certain of the said analyzers providing a plurality of ruled line reflecting surfaces symmetrically positioned about a given axis, certain other of the said analyzers provided with a plurality of parallel ruled line reflecting surfaces, means for transmitting the said light through said polarizer, said fields and said analyzers in a desired sequential manner, a fourth oscillating field producing means designed to create an oscillating field varying at a rate proportional to the oscillations of the said second and third named flux, an additional stationary universal analyzing element designed to sequentially reflect the resultant light portions received from the fourth named rotating field to a picture receiving medium, and means constituting the said medium.

14. In a picture record receiving organization, circuit means for receiving in current form in desired sequence and spaced relation trains of subject matter collectively constituting the characteristics of a certain picture, flux producing means for employing the said subject matter current to vary the intensity of a beam of polarized light in the same sequence and relative speed relation due to the transmission of the said light beam through the said flux produced by the said subject matter current, means for producing the said light, means for polarizing the said light, flux means for oscillating the said varying subject matter affected light portions so as to include a desired number of the said picture subject matter records in effect to exist during a given oscillation, a stationary universal light analyzing element associated with the said oscillating field so as to universally analyze the said elementary portions of the said light each modulated with a picture characteristic, a second flux oscillating means for neutralizing the plane polarization rotation imparted to the said universally analyzed light portions by the said second named oscillating flux whereby the plane polarization of the said light portions will be restored to the original plane polarization, a stationary analyzing means for reflecting the said light portions when the plane polarization is so restored, a fourth oscillating flux path means positioned in the path of the restored reflected light portions, a stationary curved light analyzing means designed to universally reflect the light portions received after rotation by transmission through the fourth named oscillating flux so as to sequentially direct the said light portions to a suitable picture receiving screen so as to be received in desired spaced relation and thereby reproduce the transmitted picture in same sequence and spaced relation as received in current form, and means constituting the said picture receiving screen.

15. In a device of the class described, means for producing a beam of light, optical means for concentrating the said light, means for polarizing the said concentrated light, flux path means for producing a subject matter field of flux in accordance with the variations of an image characteristic current, means for causing the said subject matter flux to rotate the plane polarization of said polarized light in accordance with the characteristics of the said subject matter field, stationary means for analyzing the said plane rotated light so as to vary the same in intensity according to the variations in density of the said subject matter flux, means for producing two oscillating fields of flux in relatively opposite phase relation to each other and at a frequency proportional to the frequency of the first named subject matter flux, means constituting a stationary universal analyzing element positioned in the path of the said beam between the two flux fields in phase opposition, a third named stationary single-plane analyzing element placed in the path of the said beam so as to receive the light after traversing the two flux fields in phase opposition and the said universal analyzer thereby to sequentially reflect the elementary portions of the said beam with plane polarization parallel to a given plane, a fourth named flux producing means designed to produce an oscillating flux with a frequency proportional to the frequency of the current employed to produce the two oscillating flux fields in phase opposition, a fourth named stationary universal light analyzing element positioned in the path of the light rotated by the fourth named oscillating flux and designed to universally reflect the elementary portions of light in their multi-analyzed condition in a sequential manner so as to traverse the subject to be scanned, means constituting the said subject to be scanned by the said multi-analyzed similar portions of the said beam, said beam positioned in the path of the said portions whereby the said portions will be varied in intensity in accordance with the characteristics of the said subject, and a light sensitive circuit element forming a portion of a closed circuit and positioned in the path of the subject matter affected light portions so as to permit the said light portions to affect the said element and thereby cause the characteristics of the said subject to be transferred into corresponding current variations.

16. In a device of the class described, means for producing magnetically rotated plane polarized light, means constituting a stationary conical reflecting universal light analyzer in the path of the said light, said analyzer arranged so as to progressively analyze elementary portions of the said light during said plane rotation, and a light sensitive means intercepting the said analyzed portions.

17. In a device of the class described, means for producing plane rotated polarized light, and stationary means for sequentially reflecting portions of the said light during said rotation.

18. In a device of the class described, means providing plane polarized light, means for rotating said plane polarization, and a stationary curved reflector formed to universally reflect portions of the light during said rotation.

19. In a device of the class described, means for producing a beam of plane rotated light, and means including a single curved reflecting surface formed to sequentially reflect different elementary portions of the said light during said rotation.

20. In a device of the class described, means constituting a source of plane rotated light, and means including a reflecting surface including a plurality of ruled line portions in the path of said light to universally reflect elementary portions of same during said rotation.

21. In a device of the class described, means for producing plane rotated light, and means providing a plurality of stationary ruled line reflecting surfaces symmetrically positioned about a common axis in the path of the said light for universally analyzing said light during said rotation.

22. In a device of the class described, means for producing plane rotated light, and stationary means for universally analyzing and universally reflecting portions of the said light, said means positioned in the path of the said light and including a single reflecting surface.

23. A method of decomposing light which consists in providing plane rotated polarized light, and sequentially reflecting portions of the light during the rotation.

24. The method of decomposing light into elementary portions which consists in producing polarized light, rotating the plane polarization of the light, and reflecting the rotated light during said rotation from a plurality of ruled line surfaces.

25. In a device of the class described, means including magneto-optical elements for producing and varying plane rotated light, means including a curved reflecting surface positioned in the path of the rotated light and formed so as to sequentially reflect elementary portions of the rotated light as a function of the plane rotation thereof, and further means including a light sensitive circuit element positioned to intercept the reflected portions.

HOWARD J. MURRAY.